United States Patent [19]

Hatano et al.

[11] Patent Number: 4,935,757
[45] Date of Patent: Jun. 19, 1990

[54] LIQUID CRYSTAL DISPLAY DEVICE

[75] Inventors: Akitsugu Hatano, Tenri; Kenichi Nakagawa; Naofumi Kimura, both of Nara, all of Japan

[73] Assignee: Sharp Kabushiki Kaisha, Osaka, Japan

[21] Appl. No.: 223,618

[22] Filed: Jul. 25, 1988

[30] Foreign Application Priority Data

Jul. 28, 1987 [JP] Japan .................. 62-188264

[51] Int. Cl.$^5$ .................................. G02F 1/13
[52] U.S. Cl. ..................... 350/336; 350/339 F; 428/1
[58] Field of Search ............... 428/1; 350/339 F, 336

[56] References Cited

U.S. PATENT DOCUMENTS 4,591,240  5/1986  Masaki et al. ............ 350/339 F
4,684,218  8/1987  Aizawa et al. ............ 350/339 F

FOREIGN PATENT DOCUMENTS 0138459   9/1984  European Pat. Off. .
0224040  10/1986  European Pat. Off. .
6088986  10/1983  Japan .

Primary Examiner—Alexander S. Thomas
Attorney, Agent, or Firm—Birch, Stewart, Kolasch & Birch

[57] ABSTRACT

A liquid crystal display device includes a pair of transparent substrates with liquid crystal sealed therebetween. A first transparent conductive film is selectively formed on at least one of the two transparent substrates. A colored light-transmitting member is formed on the first transparent conductive film, and second transparent conductive film covers the colored light-transmitting member and is made to contact the first transparent conductive film at the area where the colored light-transmitting member is not formed.

6 Claims, 5 Drawing Sheets

FIG. 3
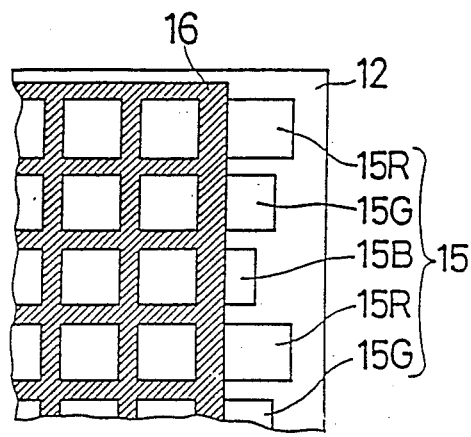
FIG. 4
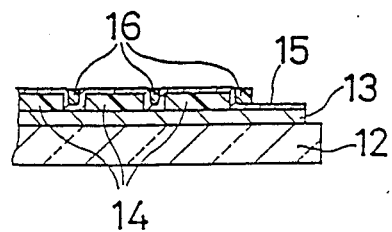
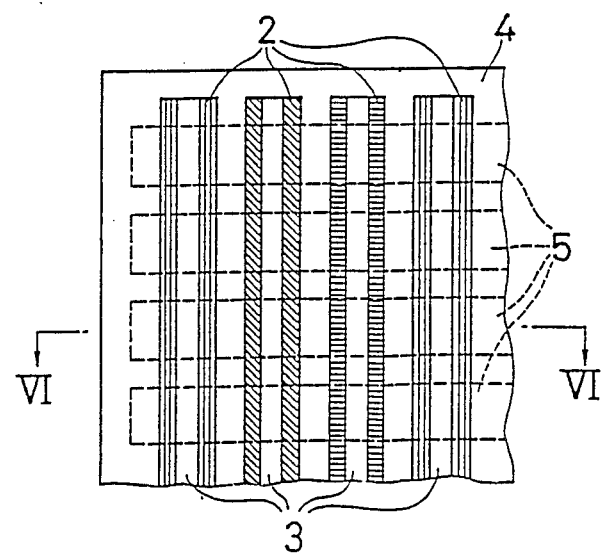
FIG. 5

LIQUID CRYSTAL DISPLAY DEVICE

BACKGROUND OF THE INVENTION

This invention relates to a liquid crystal display device suitable for use in a color display such as a color television set.

A liquid crystal color display device has the following construction. A plurality of transparent electrodes are formed on each of two transparent substrates and a color filter is provided over the transparent electrodes on either of the two transparent substrates. The two transparent substrates are faced to each other with the electrodes-formed sides inside. An orientational film is formed for orientation, covering the entire surface of that side of each transparent substrate facing the other transparent substrate. TN (Twisted Nematic) liquid crystal is filled in the space between the orientational films. A deflecting polarizing plate is provided on the other side of each transparent substrate. In the liquid crystal display device of the above construction, when voltage is applied to transparent electrodes, the optical characteristic of the liquid crystal at the positions where voltage is applied will change. Specifically, the liquid crystal transmits light or shields it depending upon the combination of the deflecting axis directions of the two deflection plates. Thus, a color image is presented on the display device as voltage is applied selectively to transparent electrodes.

To prevent deviation by parallax, the color filter is normally positioned as close to the liquid crystal layer as possible. Liquid crystal color display devices are divided into two types according to the position of the color filter: the one with a color filter provided over the transparent electrodes formed on a transparent substrate, and the one with a color filter provided on a transparent substrate and with transparent electrodes formed over the color filter.

In a typical liquid crystal display device, a plurality of X-electrodes are formed on one of two transparent substrates and a plurality of Y-electrodes on the other transparent substrate, the X-electrodes and Y-electrodes being orthogonally arranged and being made to face each other to form display picture elements at the intersections thereof. The liquid crystal display device of this type is driven in a so-called time division drive method, that is, by scanning the X-electrodes sequentially and applying display or non-display voltage to the Y-electrodes corresponding to the picture elements on the selected X-electrodes. Liquid crystal materials are relatively slow in response, and have a property that the light transmittance becomes constant after being scanned repeatedly. For a liquid crystal display device designed for high duty cycle operation and expected to provide a wider visual angle and a higher contrast, however, it is desirable that the light transmittance of the liquid crystal change sharply when applied voltage reaches a specified threshold value.

In the liquid crystal color display device with the color filter formed over the transparent electrodes, applied voltage is reduced by the color filter, causing slower change in the light transmittance around the threshold value of applied voltage. As a result, a clear image cannot be obtained on the display device. For this reason, the liquid crystal color display device with the transparent electrodes formed over the color filter is more preferable. For the display device of this type, however, because of the thermal resistance limitation of the color filter, it is not possible to raise the substrate temperature high enough to form transparent electrodes of a small resistance which is essential to a liquid crystal display device of a high duty ratio. To solve this problem, a liquid crystal display device has been proposed in which the resistance of the transparent electrodes is lowered by forming metal electrodes on the transparent electrodes.

FIG. 5 is a plan view of a transparent substrate 4 with a color filter 1, transparent electrodes 2 and metal electrodes 3 formed thereon, for use in a typical liquid crystal display device by the conventional art. FIG. 18 is a sectional view of the transparent substrate 4 cut along the line VI—VI of FIG. 5. In FIG. 5, transparent electrodes 5 formed on another transparent substrate to be arranged as opposed to the transparent substrate 4 are shown by broken lines. Referring to FIG. 18, the color filter 1 is formed into a pattern of, say, a red color filter 1R, a green color filter 1G, a blue color filter 1B, a red color filter 1R, and so on. In FIG. 5, therefore, the transparent electrodes 2 distinguished by vertical lines look red, those distinguished by oblique lines look green, and those distinguished by horizontal lines look blue.

Thus, according to the conventional art, the electrode for applying voltage to the liquid crystal layer is made up of the combination of a transparent electrode 2 and a metal electrode 3. The portion of the transparent electrode 2 on which the metal electrode 3 is placed shields light, resulting in reduced aperture of the picture elements realized by the combination between the transparent electrodes 2 and transparent electrodes 5. This hampers presentation of a clear picture.

SUMMARY OF THE INVENTION

Accordingly, it is an object of the present invention to provide a liquid crystal display device capable of showing a clear color picture of a high contrast.

Another object of the present invention is to provide a liquid crystal display device capable of showing a clear color picture of a high contrast without reducing the aperture of each picture element, thus providing a display of good quality.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a liquid crystal display device including a pair of transparent substrates and liquid crystal filled in the space between the transparent substrates comprises first transparent conductive films formed selectively on at least one of the transparent substrates, colored transmitting members formed on the first transparent conductive films, and second transparent conductive films covering the colored transmitting members and connected with the first transparent conductive films in the regions where the colored transmitting members are not formed.

According to the present invention, the first transparent conductive films are formed on at least one of the transparent substrates, and the colored transmitting members on the first transparent conductive films. The second transparent conductive films are formed over the colored transmitting members so that the second transparent conductive films are in contact with the first transparent conductive films in the areas where no colored transmitting members are formed. As a result, the first transparent conductive films provide sufficiently high conductivity, having the same function as the metal electrodes of the conventional art. Consequently, the present invention realizes a liquid crystal display device which eliminates the conventional display disadvantages caused by colored transmitting members without reducing the aperture of the colored transmitting members.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 3, 6, 7, 8, 12, 13 and 14 are plan views of the liquid crystal display device 11 for explaining the manufacturing process of the liquid crystal display device 11;

FIGS. 4, 9, 10, 11, 15, 16 and 17 are sectional views of FIGS. 3, 6–8 and 12–14 respectively;

FIG. 5 is a plan view of a transparent substrate 4 on which color filters 1, transparent electrodes 2 and metal electrodes 3 are formed, for use in the typical liquid crystal display device of the conventional art.

DETAILED DESCRIPTION OF THE EMBODIMENTS

Figure 1:
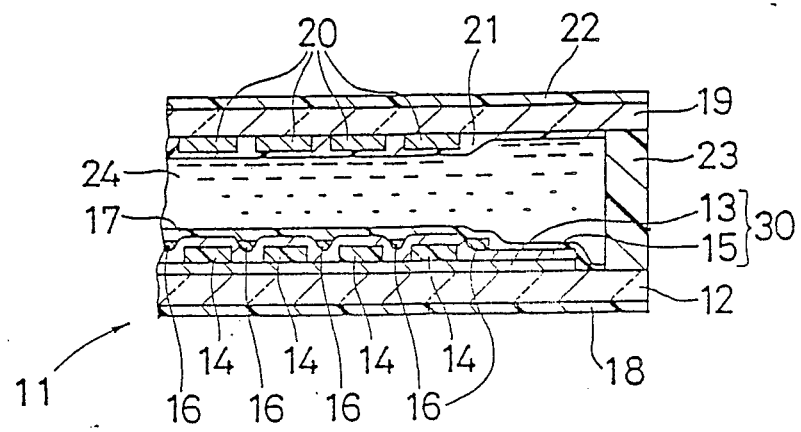
FIG. 1 is a sectional view showing the construction of an embodiment of the liquid crystal display device 11 of the present invention.

FIG. 1 is a sectional view showing the construction of an embodiment of the liquid crystal display device 11 of the present invention. The liquid crystal display device 11 of the present invention is driven by the simple matrix method for color display, although the invention is applicable to liquid crystal color display devices driven by other methods.

Referring to FIG. 1, ITO (Indium-Tin-Oxide) films 13 are formed in a stripe pattern as first transparent conductive films on the side of a transparent substrate 12 facing a liquid crystal layer. Color filters 14 are formed into a specified pattern as colored transmitting members on the ITO films 13. Each of the color filters 14 on the ITO films 13 is red, green or blue. When it is necessary to distinguish the color filters 14 by color in the subsequent description, red filters are referred to by color filters 14R, green filters by color filters 14G, and blue filters by color filters 14B.

ITO films 15 are formed as second transparent conductive films over the color filters 14 on the ITO films 13 so that the ITO films 15 are made in contact with the ITO films 13 between the color filters 14. Thus, the ITO films 13 and 15 constitute bar-shaped transparent electrodes 30. A black mask 16 is formed on the portions around the color filters 14 on the ITO films 15 as well as on the portions where the transparent electrodes 30 are not formed. An orientational film 17 is formed, covering the entire surface facing the liquid crystal layer. A deflecting plate 18 is provided on the surface of the transparent substrate 12 opposite from the lamination.

A transparent substrate 19 is arranged as opposed to the transparent substrate 12. On the surface of the transparent substrate 19 facing the liquid crystal layer are formed ITO films 20 of a stripe pattern in the direction at a right angle to the direction of the transparent electrodes 30. An orientational film 21 is formed to cover the transparent substrate 19 as well as the ITO films 20 formed thereon. A deflecting plate 22 is provided on the surface of the transparent substrate 19 opposite from the lamination.

The transparent substrate 12 and the transparent substrate 19 are spaced apart from each other by a spacer 23, and the space is filled up with liquid crystal 24 of, for example, the TN (twisted nematic) type.

Figure 2:
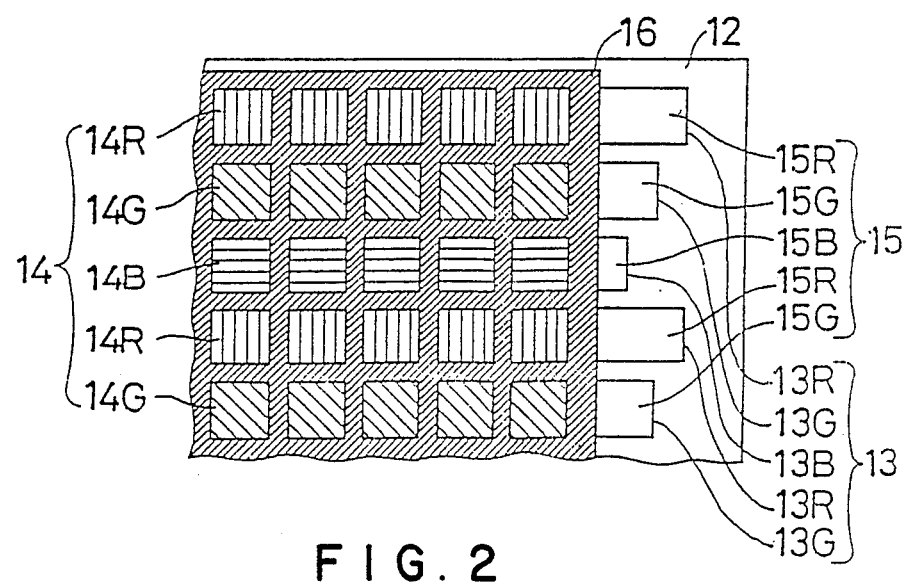
FIG. 2 is a plan view of a transparent substrate 12 on which ITO films 13, color filters 14, ITO films 15 and a black mask 16 are formed.

FIG. 2 is a plan view of the transparent substrate 12 on which the ITO films 13, the color filters 14, the ITO films 15 and the light shielding black mask 16 are formed. The black mask 16 is distinguished by right-up oblique lines. The filter portions with vertical lines (14R) should look red, the portions with right-down oblique lines (14G) should look green, and the portions with horizontal lines (14B) should look blue. Of the ITO films 15, the films on which red color filters 14R are formed and therefore constitute red-looking transparent electrodes 30 are hereinafter referred to by ITO films 15R. Similarly, the ITO films on which green color filters 14G and 14B are formed are referred to by ITO films 15G and 15B, respectively.

The transparent electrodes 30 are formed in different lengths depending upon the color of the color filters 14 to be formed thereon, so that a color filter 14 of correct color is formed on a correct position. In the following description, the ITO film 13 on which the color filters 14R are formed are referred to by ITO films 13R, those with the color filters 14G formed thereon are referred to by ITO films 13G, and those with the color filters 14B formed thereon by ITO films 13B.

FIGS. 3, 6–8 and 12–14 are plan views showing the manufacturing steps of the liquid crystal display device 11.

FIGS. 4, 9–11 and 15–17 are sectional views for explaining the manufacturing steps corresponding to those shown in FIGS. 3, 6–8 and 12–14. The manufacturing process of the liquid crystal display device 11 is described in the following with reference to these figures.

Figure 6:
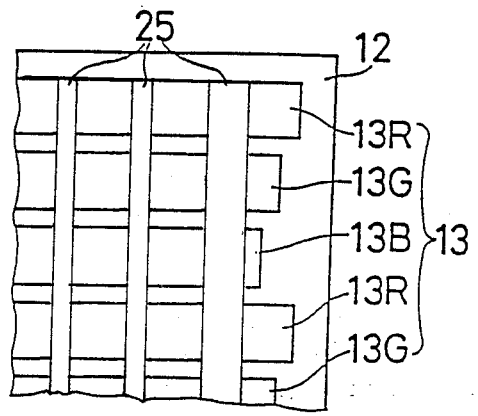
Figure 9:
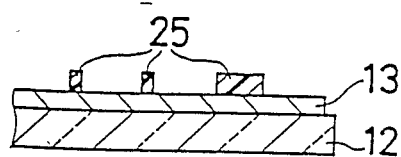

Referring to FIGS. 6 and 9, ITO film 13 is formed by the magnetron sputtering technique on a transparent substrate 12 which is heated up to 300 to 350° C. The ITO film 13 thus formed shows sufficiently high conductivity. Then the ITO film 13 is etched into a pattern of stripes of different lengths. That is, an ITO film 13R on which a red color filter 14R is to be formed, an ITO film 13G on which a green color filter 14G is to be formed and an ITO film 13B on which a blue color filter 14B is to be formed have different lengths to be distinguishable from one another. Photo resists 25 are formed into a specified pattern to cross the ITO films 13.

Figure 7:
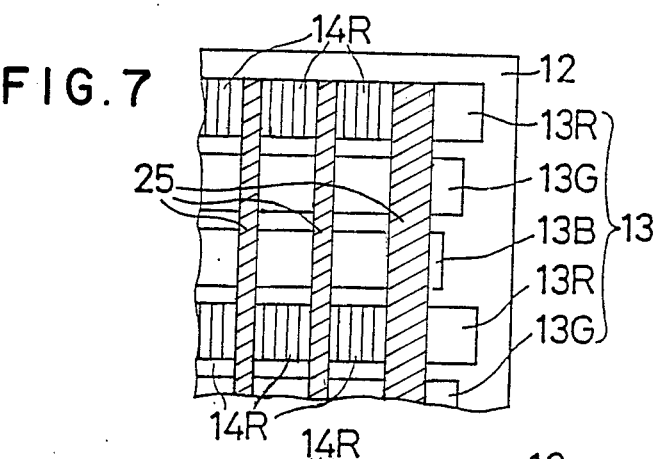
Figure 10:
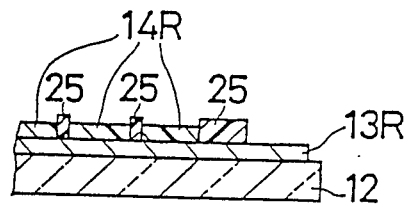

Next, red color filters 14R are formed on the ITO film 13R by the electrodeposition method in the following procedure. Electrodeposition solution is prepared by making polymer substance with electrical polarity and red pigment dispersed uniformly in solvent. The transparent substrate 12 with the ITO films 13 and the photo resists 25 formed thereon as shown in FIGS. 6 and 9 is dipped as an electrode in the electrodeposition solution. The opposite electrode is also dipped in the solution. When dc voltage is applied between the opposite electrode and the ITO film 13R, red polymer film is deposited on the ITO film 13R (Since the photo resists 25 are made of insulating material, polymer film is not formed on the photo resists 25). When the polymer film is heated, cross-linking reaction occurs, forming firm and stable color filters 14R as shown in FIGS. 7 and 10. FIG. 10 shows the section of the part related to the ITO film 13R of FIG. 7.

Figure 8:
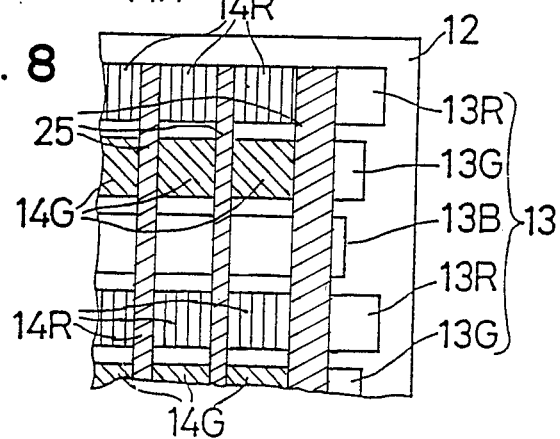
Figure 11:
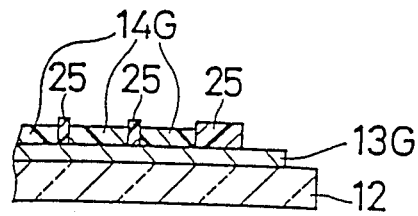
Figure 12:
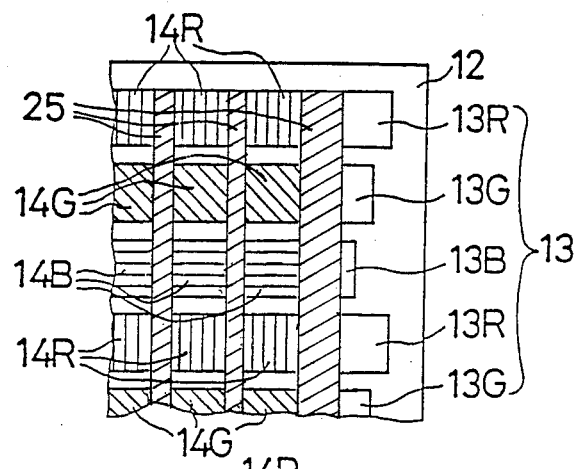
Figure 15:
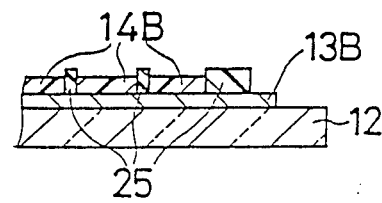

A similar operation is conducted using green pigment, to form green color filters 14G on the ITO film 13G as shown in FIGS. 8 and 11. Color filters 14B are formed by using blue pigment on the ITO film 13B as shown in FIGS. 12 and 15. Material which does not transmit ultraviolet ray is selected for the color filters 14R, 14G and 14B. FIGS. 11 and 4(4) show the sections of the parts related to the ITO films 13G and 13B, respectively.

Figure 13:
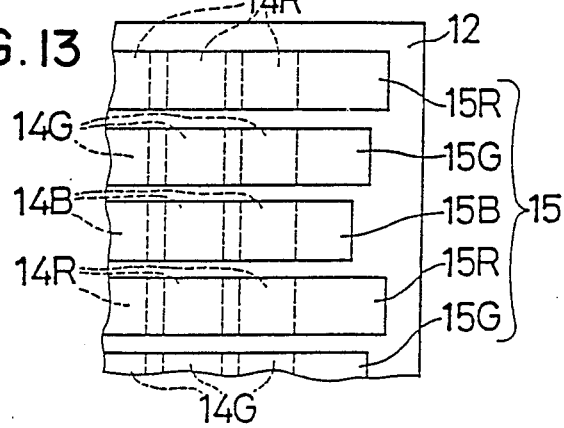
Figure 16:
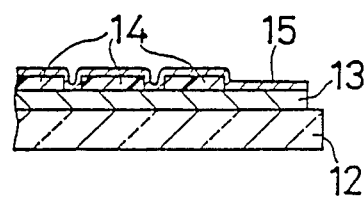

The photo resists 25 are then separated from the ITO films 13. ITO film 15 is then formed by the magnetron sputtering technique while the transparent substrate 12 is kept at a temperature not higher than 200° C. The ITO film 15 is patterned into ITO films 15R, 15G and 15B corresponding to the ITO films 13R, 13G and 13B as shown in FIGS. 13 and 16. The substrate temperature must be kept at 200° C. or lower because of the heat resistance limitation of the color filters 14. If the substrate 12 were heated higher than 200° C., the color filters 14 would be discolored.

Figure 14:
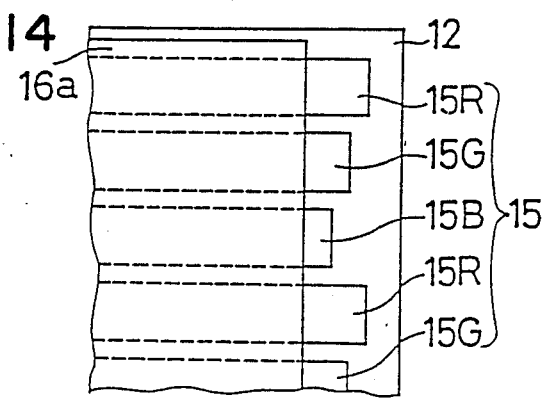
Figure 17:
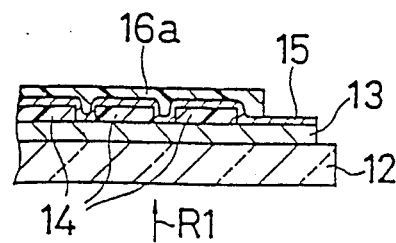
Figure 18:
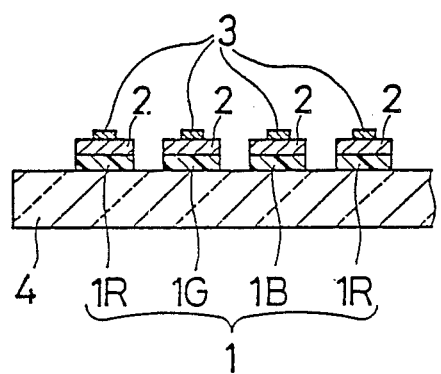
FIG. 18 is a sectional view along the line VI—VI of FIG. 5.

Next, UV-setting resin 16a containing black pigment is applied as shown in FIGS. 14 and 17, and ultraviolet ray is radiated in the direction indicated by the arrow R1 on the substrate 12 as shown in FIG. 17. Since the color filters 14 do not transmit ultraviolet ray, only the portion of the UV-setting resin 16a where there are no color filters 14 is hardened. When the part of the UV-setting resin 16a which is not hardened is removed, a black mask 16 as shown in FIGS. 3 and 4 is obtained. The structure shown in FIG. 2 is thus manufactured.

An orientational film 17 is then formed to cover the entire surface facing the liquid crystal ray, and a deflecting plate 18 is provided on the other surface of the transparent substrate 12 opposite from the liquid crystal ray. A transparent substrate 19 is placed opposite to the transparent substrate 12, and ITO films 20 are formed in a stripe pattern of the surface of the transparent substrate 19 facing the liquid crystal lay. The ITO films 20 on the transparent substrate 19 and the transparent electrodes 30 on the transparent substrate 12 face and cross each other. An orientational film 21 is then formed to cover the transparent substrate 19 and the ITO films 20 formed thereon, and a deflecting plate 22 is provided on the other surface of the transparent substrate 19 opposite from the lamination.

A spacer 23 is placed between the transparent substrate 12 and the transparent substrate 19 to space them apart. Liquid crystal 24 is put in to fill up the space between the orientational films 17 and 21. Thus, the liquid crystal display device 11 shown in FIG. 1 is obtained.

According to the present invention, as described above, the transparent electrodes 30 of the liquid crystal display device 11 comprise ITO films 13 which provide sufficiently high conductivity and ITO films 15 which cover the color filters 14 and are made in contact with the ITO films 13 between the color filters 14, the ITO films 13 having the same function as the metal electrodes 3 of the conventional art. Consequently, the resistance of the transparent electrodes 30 can be reduced as desired without decreasing the aperture of the color filters 14. As a result, the liquid crystal display device 11 of the present invention changes its light transmittance sharply around a threshold voltage value at which the optical characteristic of the liquid crystal 24 changes, and therefore presents a color picture of high quality even if the number of transparent electrodes is increased for higher time-division drive. Besides, the black mask 16 makes the picture clearer.

In the above embodiment, the electrode position method is used for forming color filters. Other methods as follows may be used. The first one is a screen-printing method in which color filters are printed using colored ink (as disclosed in the Japanese Patent Laid-Open Publication No. 58-46326). The second one is a dyeing method in which water-soluble polymer film of photosensitive gelatin, glue or casein is formed into a pattern and dyed selectively to make a specified pattern by the photo process (as disclosed in Uchida, JAPAN DISPLAY '83, P. 202 to 205). The third one is an evaporation method in which organic pigment is deposited by evaporation to form a specified pattern (as disclosed in Sugata, et al, JAPAN DISPLAY '83, P. 210 to 212).

Thus, the present invention realizes a liquid crystal display device which is capable of providing a color picture of an optimum contrast with no color bleeding without reducing the aperture of the colored light transmitting member.

While only certain embodiments of the present invention have been described, it will be apparent to those skilled in the art that various changes and modifications may be made therein without departing from the spirit and scope of the present invention as claimed.

What is claimed is:

1. A liquid crystal display having a plurality of display elements comprising:
   first and second spaced apart parallel substrates;
   a liquid crystal material provided between said parallel substrates;
   first and second groups of first and second electrodes formed on said first and second substrates, respectively, said first and second electrodes intersecting to form display elements defined thereby;
   each of said first electrodes being transparent and extending across said first substrate to define a first group of display elements;
   color filters extending across said display elements; and
   conductive overlay electrodes, each extending across a corresponding area of said first electrodes and covering the color filters extending across the said display elements defined thereby;
   each said conductive overlay electrode being connected to its associated said first electrode only on areas not overlying said display elements to thereby form a conductive electrode assembly having a lowered resistance without reducing the color filtered area of said display elements.

2. The liquid crystal display of claim 1 wherein said display is a matrix display and wherein said first and second groups of first and second electrodes comprise groups of collinear electrodes.

3. The liquid crystal display of claim 2 wherein said first and second electrodes are formed of a transparent Indium Tin Oxide film.

4. The liquid crystal display of claim 2 further comprising a black mask formed over said overlay electrodes and having openings provided therein in registration with said picture elements.

5. The liquid crystal display of claim 4 wherein said black mask is made of UV-setting resin.

6. The liquid crystal display of claim 1, wherein the resistance of each said conductive electrode assembly is sufficiently small so that the light transmittance of said liquid crystal material is changed suddenly around the threshold voltage value at which the optical characteristic of said liquid crystal material changes.

* * * * *